United States Patent
Krolak et al.

(10) Patent No.: US 10,444,055 B2
(45) Date of Patent: Oct. 15, 2019

(54) APPARATUS AND METHOD TO DETECT LIQUID MATERIAL AT THE END OF THE WAVEGUIDE IN A GUIDED WAVE RADAR SYSTEM

(71) Applicant: Honeywell International Inc., Morristown, NJ (US)

(72) Inventors: Adam Krolak, Plochocin (PL); Stuart James Heath, Surrey (CA)

(73) Assignee: Honeywell International Inc., Morris Plains, NJ (US)

( * ) Notice: Subject to any disclaimer, the term of this patent is extended or adjusted under 35 U.S.C. 154(b) by 423 days.

(21) Appl. No.: 14/851,766

(22) Filed: Sep. 11, 2015

(65) Prior Publication Data

US 2017/0074709 A1    Mar. 16, 2017

(51) Int. Cl.
G01F 23/284 (2006.01)
G01S 13/88 (2006.01)
H01Q 1/22 (2006.01)
H01Q 1/36 (2006.01)

(52) U.S. Cl.
CPC ........... *G01F 23/284* (2013.01); *G01S 13/88* (2013.01); *H01Q 1/225* (2013.01); *H01Q 1/36* (2013.01)

(58) Field of Classification Search
CPC .... H01Q 1/225; G01F 23/284; G01F 23/2845
See application file for complete search history.

(56) References Cited

U.S. PATENT DOCUMENTS

| | | | | |
|---|---|---|---|---|
| 4,158,964 A * | 6/1979 | McCrea | ............... | G01F 23/68 73/290 V |
| 5,421,193 A * | 6/1995 | Carlin | ................. | G01F 23/72 324/207.13 |
| 5,656,774 A * | 8/1997 | Nelson | ................. | G01F 23/284 73/290 V |
| 5,900,546 A * | 5/1999 | Wilkins | ................ | G01F 23/72 340/624 |
| 6,229,476 B1 * | 5/2001 | Lutke | .................. | G01F 23/284 324/332 |
| 6,802,218 B2 * | 10/2004 | Patel | ................... | G01F 23/2963 324/207.13 |

(Continued)

FOREIGN PATENT DOCUMENTS

| | | |
|---|---|---|
| EP | 2026046 | 2/2009 |
| EP | 2120062 | 11/2009 |
| JP | H07-92252 | 4/1995 |

OTHER PUBLICATIONS

European Search Report issued for EP 15158997.5 dated Sep. 15, 2015, 6 pgs.

(Continued)

*Primary Examiner* — Matthew M Barker

(57) ABSTRACT

An apparatus includes a transceiver configured to generate a signal and receive a plurality of reflected signals for measurement of a level of a process fluid in a tank. The apparatus also includes a waveguide comprising a probe and a buoyant part. The probe is configured to guide the signal from the transceiver and the plurality of reflected signals to the transceiver. The buoyant part is configured to move with the level of the process fluid at an end of the probe and produce a secondary signal representing the level of the process fluid when a level signal of the process fluid is within an end signal representing the end of the probe.

18 Claims, 4 Drawing Sheets

(56) References Cited

U.S. PATENT DOCUMENTS

| | | | |
|---|---|---|---|
| 7,262,607 B2 * | 8/2007 | Champion | G01F 23/284 |
| | | | 324/637 |
| 7,403,860 B2 * | 7/2008 | Hart | G01F 23/2963 |
| | | | 702/25 |
| 7,454,969 B2 * | 11/2008 | Hart | G01F 23/2963 |
| | | | 702/25 |
| 7,461,550 B2 | 12/2008 | Calabrese | |
| 8,171,786 B2 * | 5/2012 | Burris | G01F 23/2962 |
| | | | 73/290 V |
| 8,656,774 B2 * | 2/2014 | Moss | G01F 23/00 |
| | | | 73/311 |
| 8,803,628 B1 | 8/2014 | Kroening | |
| 8,957,741 B2 | 2/2015 | Kroening | |
| 9,518,858 B2 * | 12/2016 | Edvardsson | G01S 13/88 |
| 9,638,568 B2 * | 5/2017 | Haas | G01F 23/284 |
| 2003/0206131 A1 | 11/2003 | Steinbuch | |
| 2004/0093942 A1 | 5/2004 | Brun | |
| 2005/0241391 A1 * | 11/2005 | Kull | G01F 23/284 |
| | | | 73/313 |
| 2006/0169039 A1 | 8/2006 | Zalenski et al. | |
| 2009/0265132 A1 * | 10/2009 | Schrittenlacher | G01F 23/00 |
| | | | 702/137 |
| 2012/0137767 A1 * | 6/2012 | Silvermint | G01F 23/284 |
| | | | 73/290 R |
| 2014/0049334 A1 | 2/2014 | Kroening | |
| 2014/0103950 A1 | 4/2014 | Janitch | |
| 2014/0104014 A1 | 4/2014 | Kroening | |
| 2014/0207395 A1 | 7/2014 | Prinstil | |
| 2015/0011953 A1 | 1/2015 | Schmidt | |
| 2015/0028967 A1 | 1/2015 | Kroening | |
| 2016/0091357 A1 * | 3/2016 | Hedtke | G01F 23/284 |
| | | | 342/124 |

OTHER PUBLICATIONS

Adam Krolak, "Apparatus and Method for Adjusting Guided Wave Radar Pulse Width to Optimize Measurements", U.S. Appl. No. 15/008,110, filed Jan. 27, 2016.

International Searching Authority, "Notification of Transmittal of the International Search Report and the Written Opinion of the International Searching Authority, or the Declaration," dated Nov. 15, 2016, 5 pages, publisher International Application Division Korean Intellectual Property Office, Daejeon, Republic of Korea.

International Searching Authority, "Written Opinion of the International Searching Authority," dated Nov. 15, 2016, 5 pages, publisher International Application Division Korean Intellectual Property Office, Daejeon, Republic of Korea.

Michael Kon Yew Hughes, "Apparatus and Method for Adjusting Guided Wave Radar Pulse Width to Optimize Measurements," U.S. Appl. No. 15/008,110, filed Feb. 8, 2016, 27 pages.

* cited by examiner

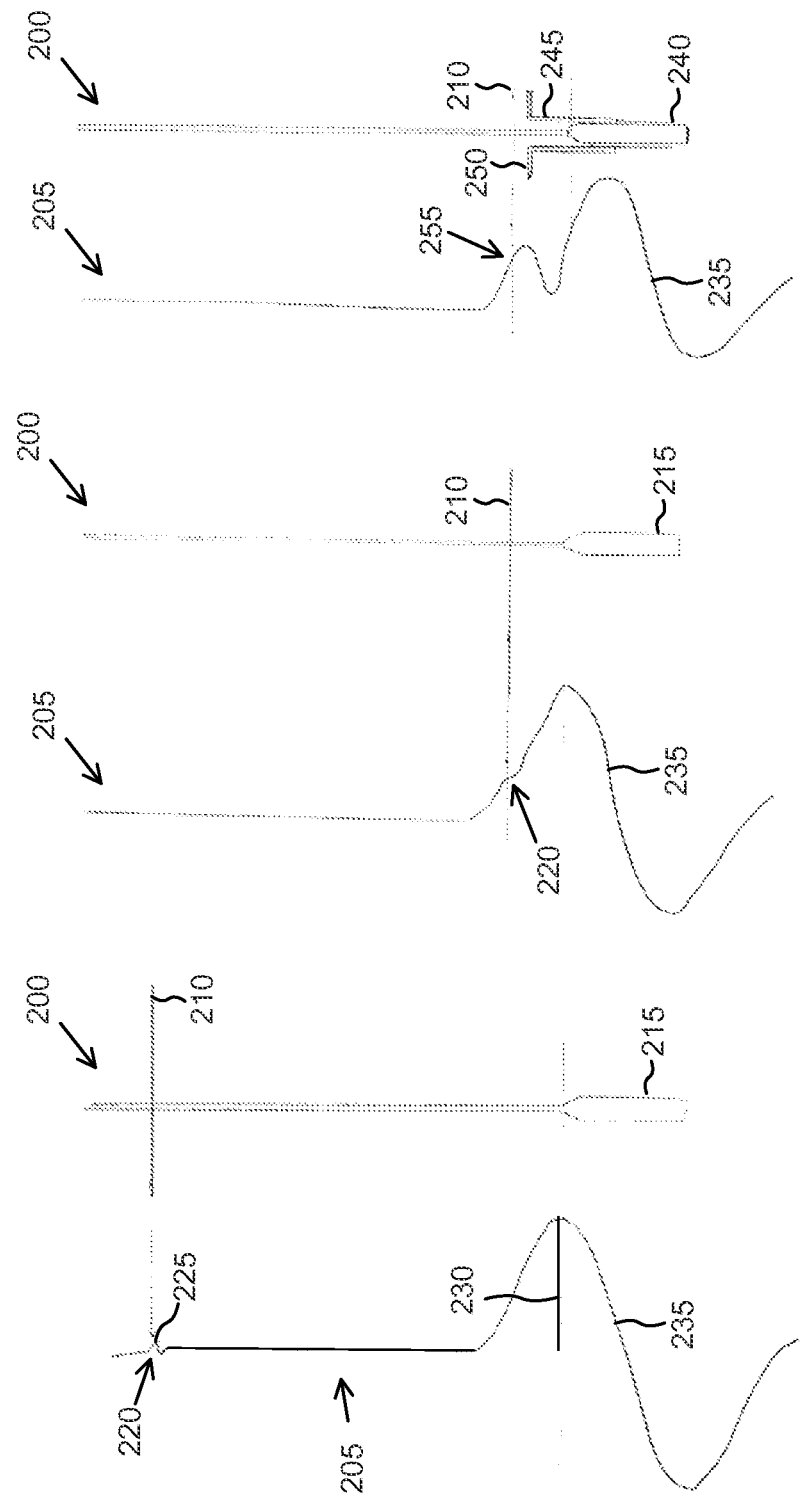

US 10,444,055 B2

APPARATUS AND METHOD TO DETECT LIQUID MATERIAL AT THE END OF THE WAVEGUIDE IN A GUIDED WAVE RADAR SYSTEM

TECHNICAL FIELD

This disclosure relates generally to guided wave radar systems. More specifically, this disclosure relates to an apparatus to detect liquid material at the end of a waveguide in a guided wave radar system.

BACKGROUND

Accuracy and consistency for level measurements is of great importance to different industries. Level measurements are taken and used for both processes and storage tanks for inventory and control. The reliable measurement and reporting of fluid level is often critical to a process efficiency and safety of a storage tank. The end of measurement range or the bottom of the tank receives special attention to reliably detect the emptiness or nearly emptiness of a product in a storage tank.

For non-contact level measurement methods employing time of flight methods, such as ultrasound, radar, and laser, the measurement extends nearly to the bottom of the tank with some margin defined by the manufacturer. Even then, the measurement is usually not possible or not reliable to the absolute bottom of the tank.

SUMMARY

This disclosure provides a modified waveguide design to detect liquid material at the end of a waveguide in a guided wave radar system.

In a first embodiment, an apparatus includes a transceiver configured to generate a signal and receive a plurality of reflected signals for measurement of a level of a process fluid in a tank. The apparatus also includes a waveguide that includes a probe and a buoyant part. The probe is configured to guide the signal from the transceiver and the plurality of reflected signals to the transceiver. The buoyant part is configured to move with the level of the process fluid at an end of the probe and produce a secondary signal representing the level of the process fluid when a level signal of the process fluid is within an end signal representing the end of the probe.

In a second embodiment, a waveguide includes a probe and a buoyant part. The probe is configured to guide the signal from the transceiver and the plurality of reflected signals to the transceiver. The buoyant part is configured to move with a level of a process fluid at an end of the probe and produce a secondary signal representing the level of the process fluid when a level signal of the process fluid is within an end signal representing the end of the probe.

In a third embodiment, a method includes generating a signal from a transceiver along a probe for measuring a level of a process fluid. The method also includes reflecting a secondary signal representing the level of the process fluid that is produced from the signal reflecting off a buoyant part of an end of the probe. The method further includes receiving the secondary signal at the transceiver.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A, 2B and 2C illustrate sample transmitted pulses that have been received after reflection according to this disclosure;

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

In contacting level measurement methods, like guided wave radar, the measurement is performed along a probe. Typically, the ability to make an accurate measurement ends nearly at the end of the probe. In the case of measurements of liquid materials with a low dielectric constant (DC), the signal reflection (such as an electromagnetic wave reflection) from the end of the probe is significantly stronger than the signal reflection from the medium approaching the end of the probe. In other words, when the liquid in the storage tank is almost depleted or at a level within the end weight, the smaller reflection from the liquid is more difficult to detect over the greater reflection of the end of the probe. This situation makes reliable detection and tracking of the level reflection difficult when the level of the liquid is close to the end of the probe. This is especially true for low DC liquids such as oils, fuels, liquefied gasses, etc. The measurements at this level can also be erratic.

Figure 1:
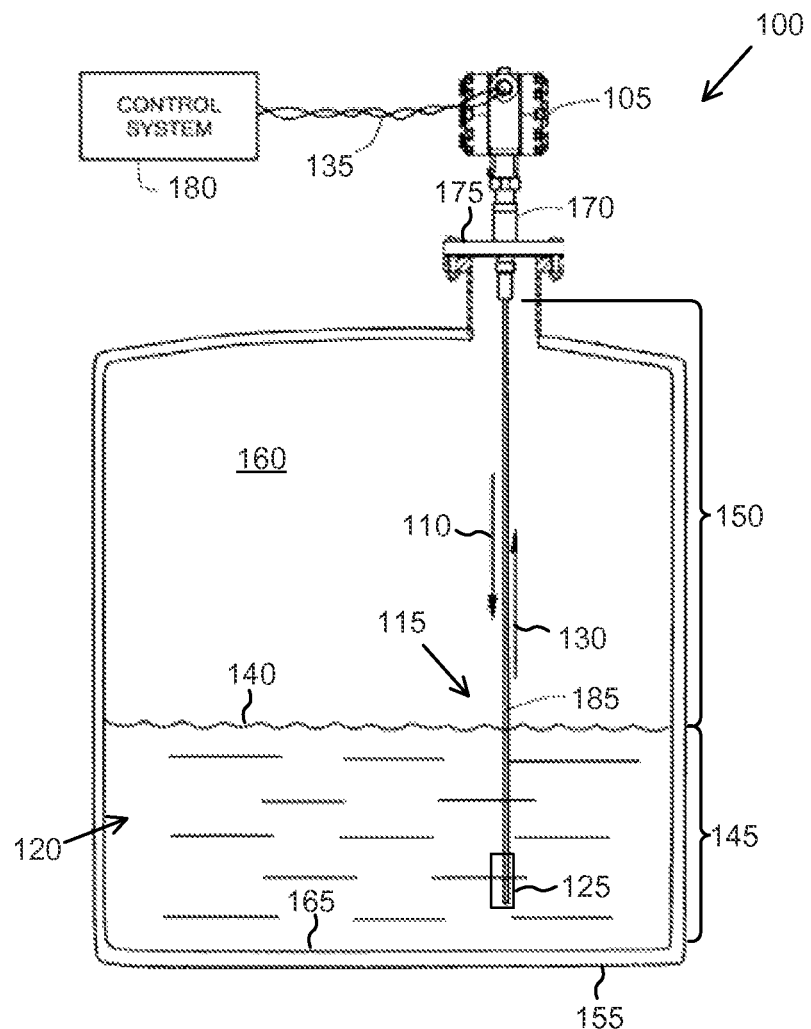
FIG. 1 illustrates an example guided wave radar (GWR) level sensor according to this disclosure.

FIG. 1 illustrates an example guided wave radar (GWR) level sensor 100 according to this disclosure. As shown in FIG. 1, the level sensor 100 utilizes a transceiver 105 to send transmitted pulses 110 through a modified waveguide 115. The probe 185 extends through an interior space 160 of a process fluid reservoir, tank 155, process fluid chamber, or other space into a process fluid 120 (sometimes under pressure). The modified waveguide 115 includes a probe 185 that can be a flexible wire, a rigid rod, or a coaxial cable. For convenience of discussion, the probe 185 will be described as a flexible wire with an end weight at the end 125 of the probe 185. When the probe is a rigid rod or a coaxial cable, both are rigid enough that the end 125 of the probe 185 can be unattached or attached to the bottom 165 of the tank 155. The end 125 of the probe 185 produces a stronger reflected signal than the surface of the fluid with low DC.

When the probe 185 is a flexible wire, the probe 185 is held tight by an end weight, which assists keeping the probe 185 straight and vertical for increasing the reliability of the level measurements. At least some of the transmitted pulses 110 are reflected from the surface 140 of the process fluid 120 and travel back as reflected pulses 130 to the transceiver 105 along the probe 185. The transceiver 105 receives the reflected pulses 130, and the level sensor 100 calculates the fluid level 145 or height of the process fluid 120 in the space 160. For instance, the level sensor 100 could perform time-of-flight or other calculations to identify a distance 150 from the transceiver 105 to the level 145 of the process fluid 120. The level sensor 100 can use the calculated level 145 of the process fluid 120 in any suitable manner, such as by communicating the calculated distance to a control system 180 or other destination(s) over at least one signaling medium 135. While the signaling medium 135 is shown here as a wired connection, other types of signaling media (such as wireless connections) could be supported by the level sensor 100.

The dielectric constant of the process fluid 120 causes a variation in the impedance seen by the transmitted pulses 110 along the probe 185, which causes the reflected pulses 130 to return along the probe 185. When several process fluids have different dielectric constants and form multiple layers within the process fluid 120 (such as when an oil-based fluid, an emulsion or surfactant layer, and a water-based fluid are present), the level sensor 100 can be employed to measure the level 145 of each layer within the process fluid 120.

The end weight can be a part of the modified waveguide 115 or an additional piece. Gravity and buoyancy are taken into consideration when deciding the shape and material of the end weight. The end weight can include different configurations that react to the buoyancy of the process fluid 120 in order to strengthen the reflected pulse 130 at the surface 140 when the fluid level 145 approaches the end weight.

A guide wire serves as the probe 185 in the example of FIG. 1 and extends into the interior 160 of the tank 155 (often but not necessarily from the top of the tank 155) toward the bottom 165 of the tank 155. Since the probe 185 should extend into the process fluid 120, the probe 185 could extend far enough through the interior 160 of the tank 155 so that its bottom end 125 is close to the bottom surface 165 of the tank 155. When the probe 185 is either a rigid rod or coaxial cable, a buoyant part can be mounted at the end of the probe 185 without a need for an end weight.

A process connector 170 connects the modified waveguide 115 to the transceiver 105. In this example, the process connector 170 is mounted on a bulkhead 175 over an opening in the tank 155, although the process connector 170 could be used or mounted in other ways. The transceiver 105 is communicably coupled by the signaling medium 135 to the control system 180. Note that while depicted as a simple twisted pair of conductors, the signaling medium 135 could denote any suitable analog or digital signaling media, including wired and wireless connections. As those skilled in the art will recognize, the control system 180 could communicate control signals to the level sensor 100 and receive level measurements from the level sensor 100 via the signaling medium 135.

Transmitted pulses 110 from the transceiver 105 travel along the probe 185 to a location at which the probe 185 passes through the top surface 140 of the process fluid 120. Reflected pulses 130 reflect at the surface 140 of the process fluid 120 and are received by the transceiver 105. Logic (implemented within the level sensor 100, at the control system 180, or at other location(s)) can be employed to determine the level 145 of the process fluid 120.

Although FIG. 1 illustrates one example of a GWR level sensor 100, various changes may be made to FIG. 1. For example, the GWR level sensor 100 could be used with other types of level sensors or other devices where at least one electrical connection is needed or desired. As a particular example, the GWR level sensor 100 could be used to allow an electrical connection between an antenna within a tank and a transceiver or other circuitry outside the tank. Also, while FIG. 1 shows the use of a flexible wire as the probe 185, other types of probes 185 could be used.

FIGS. 2A-2C illustrate sample transmitted pulses that have been received after reflection according to the various embodiments of the present disclosure. FIGS. 2A-2C depict the bottom portions of a level sensor 200 along with the signal 205 received corresponding to the depth of the reading. The embodiments shown in FIGS. 2A-2C may be associated with the GWR level sensor 100 in FIG. 1. Additionally or alternatively, the embodiments shown in FIGS. 2A-2C may be associated any other suitable sensor or system.

FIG. 2A depicts a level 210 of the process fluid above an end weight 215. The level 210 of the process fluid is determined from a level signal 220 received by a transceiver, such as the transceiver 105. Because the process fluid has a low dielectric constant, the amplitude 225 of the level signal 220 is tiny compared to the amplitude 230 of the end weight signal 235. FIG. 2B depicts a level 210 of the process fluid where the level signal 220 is within the end weight signal 235. In this situation, the level signal 220 is more difficult to determine, leading to false or erratic level readings. FIG. 2C depicts a modified end weight 240. The modified end weight 240 includes two buoyant arms 245 that are slidably coupled to the end weight 240. The top portion 250 of the buoyant arms 245 produces a secondary signal 255 that is greater than the level signal. The top portion 250 of the buoyant arms 245 are arranged to float on the surface of the process fluid, so that the secondary signal 255 can be used to determine the level 210 of the process fluid.

FIGS. 3A-3F illustrate different modifications of an end weight according to this disclosure. Each modified end weight includes a weighted portion for providing tension on the flexible wire probe for keeping the probe vertical, and a buoyant part configured to produce a secondary signal representing the level of the process fluid. As shown in FIGS. 3A-3F, the modified end weights 300, 305, 310, 315, 320, 325 include various components that allow reflection of at least one signal, and could be employed as the end weight in FIG. 1.

Figure 3A:
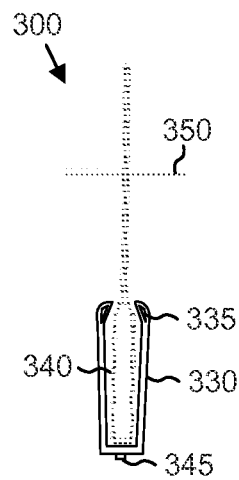
FIGS. 3A, 3B, 3C, 3D, 3E and 3F illustrate different modifications of the end weight according to this disclosure.
Figure 3B:
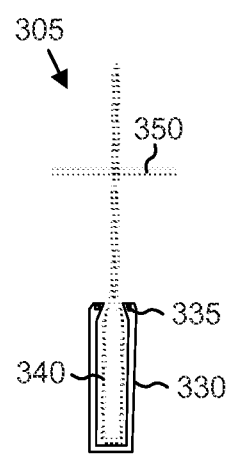
Figure 3C:
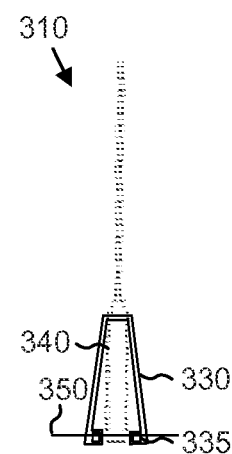

FIGS. 3A, 3B, and 3C illustrate modified end weights 300, 305, 310 with flexible arms 330 coupled to a main body 340. The modified end weights 300, 305, 310 includes the main body 340 with two flexible arms 330 that are connected to floats 335 made of a material with a high reflectivity or containing high reflectivity inserts. The inserts provide a high reflectivity for the electromagnetic signal used for measurement by the guided wave radar. The main body 340 is the weighted part of the modified end weights 300, 305, 310 that creates tension in the probe to enhance the accuracy of the level reading, and the floats 335 are the buoyant part of the modified end weights 300, 305, 310.

As shown in FIG. 3A, the flexible arms 330 are coupled to the main body 340 of the modified end weight 300 using a bolt 345. The flexible arms 330 remain in an upright position due to the floats 335, while the level 350 of the process fluid is above the modified end weight 300. When the level 350 of the process fluid falls below the top of the modified end weight 300, the flexible arms 330 bend to allow the floats 335 to remain at the surface of the process fluid. The high reflectivity inserts in the floats 335 produce a secondary signal that corresponds with the level 350 of the process fluid.

As shown in FIG. 3B, the flexible arms 330 are coupled to the main body 340 of the modified end weight 305. The floats 335 are shaped differently than the floats 335 in FIG. 3A, comprising flat surfaces at the top and sides. The flexible arms 330 remain in an upright position due to the floats 335, while the level 350 of the process fluid is above the modified end weight 305. When the level 350 of the process fluid falls below the top of the modified end weight 305, the flexible arms 330 bend to allow the floats 335 to remain at the surface of the process fluid. The high reflectivity inserts produce a secondary signal that corresponds with the level 350 of the process fluid.

As shown in FIG. 3C, the flexible arms 330 are coupled to the top of the main body 340 of the modified end weight 310. The floats 335 remain in a spread position while the level 350 of the process fluid is above the modified end weight 310. As the process fluid level 350 drops below the top of the modified end weight 310, the flexible arms 330 drop into a downward position due to the floats 335. When the level 350 of the process fluid falls below the top of the modified end weight 300, the flexible arms 330 bend to allow the float 335 to remain at the surface of the process fluid. The high reflectivity inserts produce a secondary signal that corresponds with the level 350 of the process fluid.

Figure 3D:
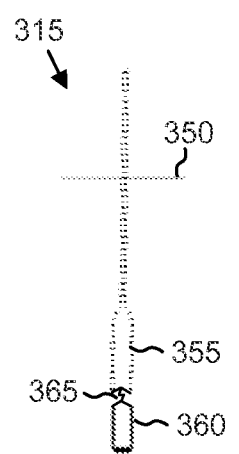
Figure 3E:
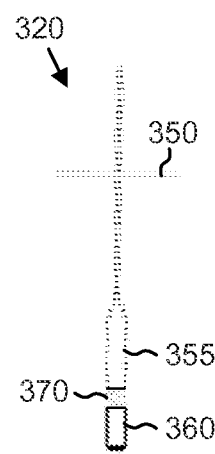
Figure 3F:
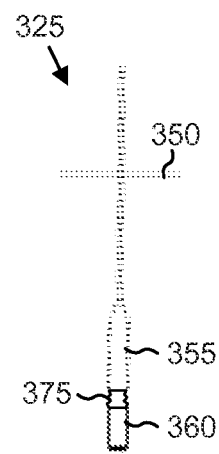

FIGS. 3D, 3E, and 3F illustrate modified end weights 315, 320, 325 with a weighted part 355 connected to a buoyant part 360. The weighted part 355 creates tension in the flexible wire probe, while the buoyant part 360 enhances the reflected signal at the surface of the process fluid by creating a secondary signal. The buoyant part 360 changes the signal reflected from the end of the probe by getting closer to the weighted part 355 when the level of the process fluid reaches the end of the probe. FIG. 3D illustrates a modified end weight 315 having a weighted part 355 connected to a buoyant part 360 by a wire 365. FIG. 3E illustrates a modified end weight 320 having a weighted part 355 connected to a buoyant part 360 by a spring 370. FIG. 3F illustrates a modified end weight 325 having a weighted part 355 connected to a buoyant part 360 by a polymer accordion 375.

Although FIGS. 3A-3F illustrate examples of modified end weights, various changes may be made to FIGS. 3A-3F. For example, the relative sizes and shapes of different components within the connectors are for illustration only. For other probes (e.g., coaxial cable or rigid rod) that do not use an end weight, the modification can be mounted directly at the end of the probe. Similar to the flexible wire probe, the modification of the other probes may include a buoyant part that can move in relation to the end of the probe by means of flexible arms, sliding, movement of springs, accordions, or other components.

Figure 4:
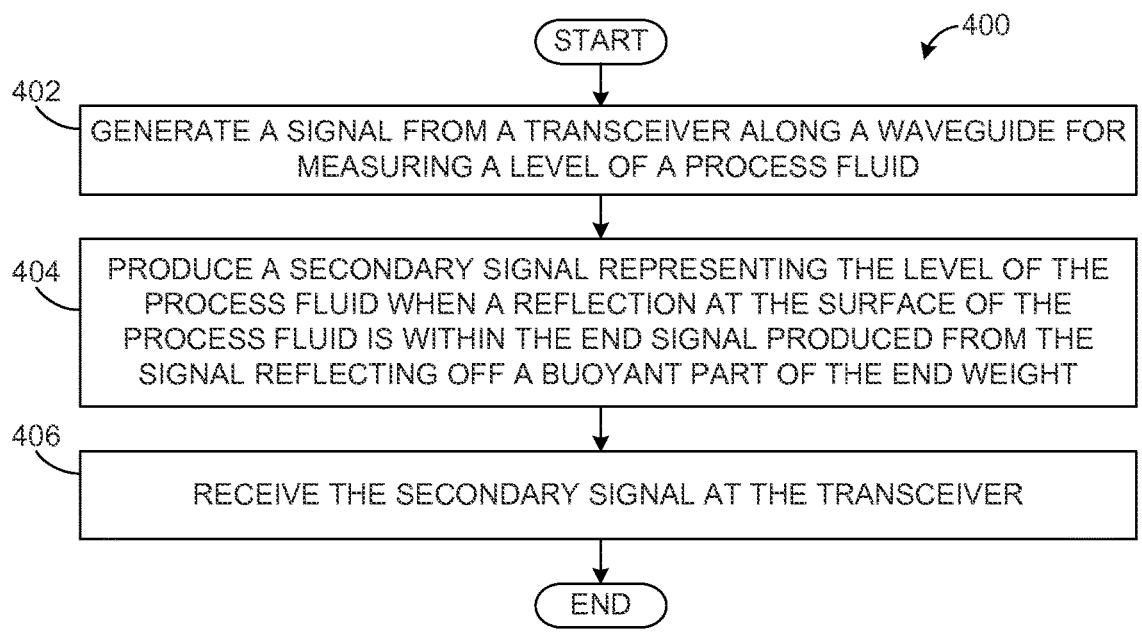
FIG. 4 illustrates an example method for detecting process fluids at the end of a waveguide in a guided wave radar system according to this disclosure.

FIG. 4 illustrates an example method 400 for detecting process fluids at the end of a probe in a guided wave radar system according to this disclosure. For ease of explanation, the method 400 is described in connection with the level sensor 100 of FIG. 1, and the modified end weights 300, 305, 310, 315, 320, 325 of FIG. 3. However, the method 400 could involve the use of any other suitable components or devices.

In operation 402, a transceiver generates a signal along a probe for measuring a level of a process fluid. In operation 404, when the level signal from the reflection of the signal at the surface of the process fluid is within the end signal, a secondary signal is produced from the signal reflecting off the buoyant part of the end weight. In operation 406, the transceiver receives the secondary signal.

Although FIG. 4 illustrates one example of a method 400 for detecting process fluids at the end of a probe in a guided wave radar system, various changes may be made to FIG. 4. For example, various steps shown in FIG. 4 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a transceiver configured to generate a signal and receive a plurality of reflected signals for measurement of a level of a process fluid in a tank;
a waveguide comprising:
a probe configured to guide the signal from the transceiver and the plurality of reflected signals to the transceiver;
an end weight mounted at an end of the probe; and
a buoyant part slidably coupled to the end weight and configured to move with the level of the process fluid, wherein the buoyant part is configured to produce a secondary signal representing the level of the process fluid and the end weight is configured to produce an end weight signal representing the end of the probe.

2. The apparatus of claim 1, wherein the buoyant part comprises a high reflectivity material configured to produce the secondary signal.

3. The apparatus of claim 1, wherein the buoyant part comprises one or more floats at an end of one or more flexible arms.

4. The apparatus of claim 1, wherein the probe comprises a flexible wire.

5. The apparatus of claim 1, further comprising a level sensor configured to calculate the level of the process fluid based on the secondary signal received by the transceiver.

6. The apparatus of claim 5, wherein:
a plurality of fluids with different dielectric constants are contained within the tank, and
the level sensor is further configured to determine a level for each of the plurality of fluids.

7. A waveguide comprising:
a probe configured to guide a signal from a transceiver and a plurality of reflected signals to the transceiver;
an end weight mounted at an end of the probe; and
a buoyant part slidably coupled to an end weight and configured to move with a level of a process fluid, wherein the buoyant part is configured to produce a secondary signal representing the level of the process fluid and the end weight is configured to produce an end weight signal representing the end of the probe.

8. The waveguide of claim 7, wherein the buoyant part comprises a high reflectivity material configured to produce the secondary signal.

9. The waveguide of claim 7, wherein the buoyant part comprises one or more floats at an end of one or more flexible arms.

10. The waveguide of claim 7, wherein the probe comprises a flexible wire.

11. The waveguide of claim 7, further comprising a level sensor configured to calculate the level of the process fluid based on the secondary signal received by the transceiver.

12. The waveguide of claim 11, wherein:
a plurality of fluids with different dielectric constants are contained within a tank, and
the level sensor is further configured to determine a level for each of the plurality of fluids.

13. A method comprising:
generating a signal from a transceiver along a probe for measuring a level of a process fluid;
reflecting a secondary signal representing the level of the process fluid that is produced from the signal reflecting off a buoyant part mounted at an end of the probe to an end weight wherein the buoyant part is slidably coupled to the end weight; and
receiving the secondary signal at the transceiver.

14. The method of claim 13, wherein the buoyant part comprises a high reflectivity material configured to produce the secondary signal.

15. The method of claim 13, wherein the buoyant part comprises one or more floats at an end of one or more flexible arms.

16. The method of claim 13, wherein the probe comprises a flexible wire.

17. The method of claim 13, further comprising calculating, using a level sensor, the level of the process fluid based on the secondary signal received by the transceiver.

18. The method of claim 17, wherein:
a plurality of fluids with different dielectric constants are contained within the tank, and
the method further comprises determining, using the level sensor, a level for each of the plurality of fluids.

* * * * *